(12) United States Patent
Koike et al.

(10) Patent No.: US 11,370,568 B2
(45) Date of Patent: Jun. 28, 2022

(54) FORM-FILL-SEAL MACHINE AND FORM-FILL-SEAL SYSTEM

(71) Applicant: ISHIDA CO., LTD., Kyoto (JP)

(72) Inventors: Shinji Koike, Ritto (JP); Makoto Ichikawa, Ritto (JP); Yuchuan Tong, Ritto (JP); Motoki Takayama, Ritto (JP); Ryo Sasaki, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 208 days.

(21) Appl. No.: 16/644,500

(22) PCT Filed: Feb. 28, 2018

(86) PCT No.: PCT/JP2018/007558
§ 371 (c)(1),
(2) Date: Mar. 5, 2020

(87) PCT Pub. No.: WO2019/049393
PCT Pub. Date: Mar. 14, 2019

(65) Prior Publication Data
US 2021/0086925 A1 Mar. 25, 2021

(30) Foreign Application Priority Data
Sep. 7, 2017 (JP) .............................. JP2017-172437

(51) Int. Cl.
*B65B 9/20* (2012.01)
*B65B 57/10* (2006.01)
(Continued)

(52) U.S. Cl.
CPC ........ *B65B 9/2049* (2013.01); *B29C 66/1122* (2013.01); *B65B 9/2007* (2013.01);
(Continued)

(58) Field of Classification Search
CPC ... B65B 9/2007; B65B 9/2028; B65B 9/2049; B65B 9/207; B65B 31/045;
(Continued)

(56) References Cited

U.S. PATENT DOCUMENTS 8,276,353 B2 10/2012 Reaves et al.
8,549,825 B2 * 10/2013 Takayama et al. ..... B65B 57/16
53/504
(Continued)

FOREIGN PATENT DOCUMENTS

JP 2007-076719 A 3/2007
JP 3904309 B2 4/2007
(Continued)

OTHER PUBLICATIONS

English language machine translation of JP 2008087827 from EPO website "worldwide.espacenet.com" (18 pages). (Year: 2021).*
(Continued)

*Primary Examiner* — Stephen F. Gerrity
(74) *Attorney, Agent, or Firm* — Shinjyu Global IP (57) ABSTRACT

A form-fill-seal machine forms a bag by filling and sealing a packing object in a wrapping material. The form-fill-seal machine includes a thickness adjustment unit which adjusts a thickness of the bag and a control unit which controls an operation of the thickness adjustment unit. The control unit acquires thickness information obtained in a rear stage of the form-fill-seal machine and relating to a thickness of the bag and controls the operation of the thickness adjustment unit on the basis of a result obtained by performing statistical processing on the thickness information.

10 Claims, 7 Drawing Sheets

(51) Int. Cl.
| | |
|---|---|
| *B29C 65/00* | (2006.01) |
| *B65B 51/30* | (2006.01) |
| *B29L 31/00* | (2006.01) |
| *G01M 3/36* | (2006.01) |
| *B65B 61/28* | (2006.01) |

(52) U.S. Cl.
CPC ..... *B65B 51/306* (2013.01); *B29L 2031/7128* (2013.01); *B65B 9/2028* (2013.01); *B65B 57/10* (2013.01); *B65B 61/28* (2013.01); *B65B 2220/18* (2013.01); *G01M 3/36* (2013.01)

(58) Field of Classification Search
CPC ..... B65B 51/146; B65B 51/306; B65B 57/00; B65B 57/02; B65B 57/04; B65B 57/08; B65B 57/10; B65B 57/16; B65B 61/28; B65B 65/00; B65B 2220/18; G01M 3/00; G01M 3/36
USPC .... 53/53, 503, 511, 551, 374.5; 73/41, 45.4, 73/49.3, 52
See application file for complete search history.

(56) References Cited

U.S. PATENT DOCUMENTS

| | | |
|---|---|---|
| 9,452,857 B2 | 9/2016 | Corbett et al. |
| 2016/0297554 A1* | 10/2016 | Hashimoto et al. .. B65B 9/2007 |

FOREIGN PATENT DOCUMENTS

| | | |
|---|---|---|
| JP | 2008-087827 A | 4/2008 |
| JP | 2015-107806 A | 6/2015 |

OTHER PUBLICATIONS

English language machine translation of JP 2015107806 from EPO website "worldwide.espacenet.com" (27 pages). (Year: 2021).*
English language machine translation of JP 2007076719 from EPO website "worldwide.espacenet.com" (15 pages). (Year: 2021).*
The Search Report from the corresponding International Patent Application No. PCT/JP2018/007558 dated Apr. 10, 2018.
The Preliminary Report on Patentability (with Written Opinion) from the corresponding International Patent Application No. PCT/JP2018/007558 dated Mar. 10, 2020.
The Declaration as to non-prejudicial disclosures or exceptions to lack of novelty (Box No. VIII) declared in the PCT request form (RO101) from the corresponding International Patent Application No. PCT/JP2018/007558 filed on Feb. 28, 2018.
The Examination Report from the corresponding Indian Patent Application No. 202017012151 dated Sep. 10, 2021.

* cited by examiner

| | No. | RESULT | THICKNESS [mm] |
|---|---|---|---|
| G1 (G) | 1 | GOOD | 35.78 |
| | 2 | Flat | 34.56 |
| | 3 | Flat | 33.43 |
| | 4 | GOOD | 35.76 |
| | 5 | GOOD | 35.33 |
| G2 (G) | 6 | GOOD | 35.43 |
| | 7 | GOOD | 35.54 |
| | 8 | Flat | 34.45 |
| | 9 | GOOD | 35.74 |
| | 10 | Flat | 34.32 |
| G3 (G) | 11 | GOOD | 35.65 |
| | 12 | Flat | 34.31 |
| | 13 | Flat | 33.65 |
| | 14 | GOOD | 35.01 |
| | 15 | GOOD | 35.54 |
| | 16 | GOOD | 35.43 |

*Fig.7A*

| No. | RESULT | THICKNESS [mm] |
|---|---|---|
| 1 | GOOD | 35.78 |
| 2 | Thick | 36.96 |
| 3 | Flat | 33.43 |
| 4 | GOOD | 35.76 |

*Fig.7B*

| No. | RESULT | THICKNESS [mm] |
|---|---|---|
| 1 | GOOD | 35.78 |
| 2 | Leak | 29.24 |
| 3 | Flat | 33.43 |
| 4 | GOOD | 35.76 | ially, in the form-fill-seal machine, it is preferable to
FORM-FILL-SEAL MACHINE AND FORM-FILL-SEAL SYSTEM

CROSS-REFERENCE TO RELATED APPLICATIONS

This application is the U.S. National Phase of PCT/JP2018/007558, filed Feb. 28, 2018, which claims priority to Japanese Patent Application No. 2017-172437. Both of those applications are incorporated by reference herein in their entireties.

TECHNICAL FIELD

The present disclosure relates to a form-fill-seal machine and a form-fill-seal system.

BACKGROUND ART

A form-fill-seal machine which forms a bag by filling and sealing a packing object in a wrapping material is known. For example, Japanese Patent No. 3904309 describes a packing machine which manages a thickness of a package by detecting a thickness of a package (bag) using a thickness detection sensor and controlling a displacement amount of an air release plate on the basis of a detection signal of the thickness detection sensor.

BRIEF SUMMARY

Generally, in the form-fill-seal machine, it is preferable to make the thickness of the bag uniform when automatically and cleanly packing the formed bag in a rear stage. In this regard, there is still room for improvement in the form-fill-seal machine.

Here, an object of the present disclosure is to provide a form-fill-seal machine and a form-fill-seal system capable of making a thickness of a formed bag uniform.

A form-fill-seal machine according to an aspect of the present disclosure is a form-fill-seal machine for forming a bag by filling and sealing a packing object in a wrapping material, including: a thickness adjustment unit which adjusts a thickness of the bag; and a control unit which controls an operation of the thickness adjustment unit, in which the control unit acquires thickness information obtained in a rear stage of the form-fill-seal machine and relating to a thickness of the bag and controls the operation of the thickness adjustment unit on the basis of a result obtained by performing statistical processing on the thickness information.

In this form-fill-seal machine, the thickness of the bag is adjusted on the basis of a result obtained by performing statistical processing on the thickness information. Thus, it is possible to make the thickness of the formed bag uniform by effectively controlling the thickness of the formed bag.

In the form-fill-seal machine according to an aspect of the present disclosure, when it is determined that a thickness state of a predetermined number or more of the bags in a group of the bags is abnormal from the thickness information of the group of bags including a plurality of the bags, the control unit may control the operation of the thickness adjustment unit in response to the determination result. According to this configuration, the thickness of the bag can be adjusted by the thickness adjustment unit (hereinafter, also simply referred to as "thickness adjustment") in consideration of noise, variation, or the like included in the thickness information.

In the form-fill-seal machine according to an aspect of the present disclosure, when it is determined that the thickness state of the predetermined number or more of bags in the group of bags is thin, the control unit may control the operation of the thickness adjustment unit so that the thickness of the bag increases. When it is determined that the thickness state of a predetermined number or more of bags among the plurality of bags is thin, it is found that there is a high possibility of requiring the thickness adjustment for increasing the thickness of the bag. Thus, according to this configuration, it is possible to effectively perform the thickness adjustment for increasing the thickness of the bag.

In the form-fill-seal machine according to an aspect of the present disclosure, when it is determined that the thickness state of the bag is thick from the thickness information of the bag, the control unit may control the operation of the thickness adjustment unit so that the thickness of the bag decreases. When it is determined that the thickness state of any one of the bags is thick, it is found that there is a high possibility of requiring the thickness adjustment for decreasing the thickness of the bag. Thus, according to this configuration, it is possible to effectively perform the thickness adjustment for increasing the thickness of the bag.

In the form-fill-seal machine according to an aspect of the present disclosure, the control unit may calculate a moving average of the thickness of the bag from the thickness information and control the operation of the thickness adjustment unit on the basis of the calculated moving average. According to this configuration, the thickness can be adjusted in consideration of the variation included in the thickness information.

In the form-fill-seal machine according to an aspect of the present disclosure, the control unit may control the operation of the thickness adjustment unit so that the thickness of the bag increases by a small amount or decreases by a small amount. Since the thickness information can be obtained at the rear stage of the form-fill-seal machine, there is a delay before the result obtained by adjusting the thickness of the bag by the thickness adjustment unit is reflected on the thickness information. Thus, since the thickness of the bag is increased by a small amount or decreased by a small amount, it is possible to suppress an adverse effect caused by the delay from influencing the thickness adjustment as compared with a case in which the thickness of the bag is greatly increased or decreased by a certain amount at one time.

In the form-fill-seal machine according to an aspect of the present disclosure, the control unit may control the operation of the thickness adjustment unit so that the thickness of the bag becomes a target thickness. According to this configuration, it is possible to promptly make the thickness of the formed bag uniform.

In the form-fill-seal machine according to an aspect of the present disclosure, the control unit may correct a control amount of the thickness adjustment unit in response to a correction value and the correction value may be a preset value or a learning value obtained by machine learning based on a past control history of the control unit.

According to this configuration, it is possible to promptly make the thickness of the bag uniform with high accuracy.

In the form-fill-seal machine according to an aspect of the present disclosure, when it is determined that the bag sealed state is poor from the thickness information, the control unit may ignore the thickness information. It is found that the poor bag sealed state often occurs due to an abnormality in a portion other than the thickness adjustment unit and occurs regardless of whether the thickness adjustment is performed.

Thus, when it is determined that the bag sealed state is poor, unnecessary information for adjusting the thickness of the bag can be excluded by ignoring the thickness information.

In the form-fill-seal machine according to an aspect of the present disclosure, the control unit may perform an interval control that ignores the thickness information of a certain number of the bags created immediately after controlling the operation of the thickness adjustment unit. According to this configuration, it is possible to control the operation of the thickness adjustment unit on the basis of the thickness information in consideration of the above-described delay (the thickness information which excludes the one not reflecting the precedent thickness adjustment result).

A form-fill-seal system according to an aspect of the present disclosure includes: the above-described form-fill-seal machine and a thickness information acquisition unit which is disposed in a rear stage of the form-fill-seal machine and acquires thickness information.

Also in the form-fill-seal system, since the form-fill-seal machine is provided, it is possible to make the thickness of the formed bag uniform by effectively controlling the thickness of the formed bag.

According to the present disclosure, it is possible to provide a form-fill-seal machine and a form-fill-seal system capable of making a thickness of a formed bag uniform.

DESCRIPTION OF EMBODIMENTS

Hereinafter, an embodiment will be described in detail with reference to the drawings. In the drawings, the same reference numerals will be given to the same or corresponding portion and a redundant description will be omitted.

Figure 1:
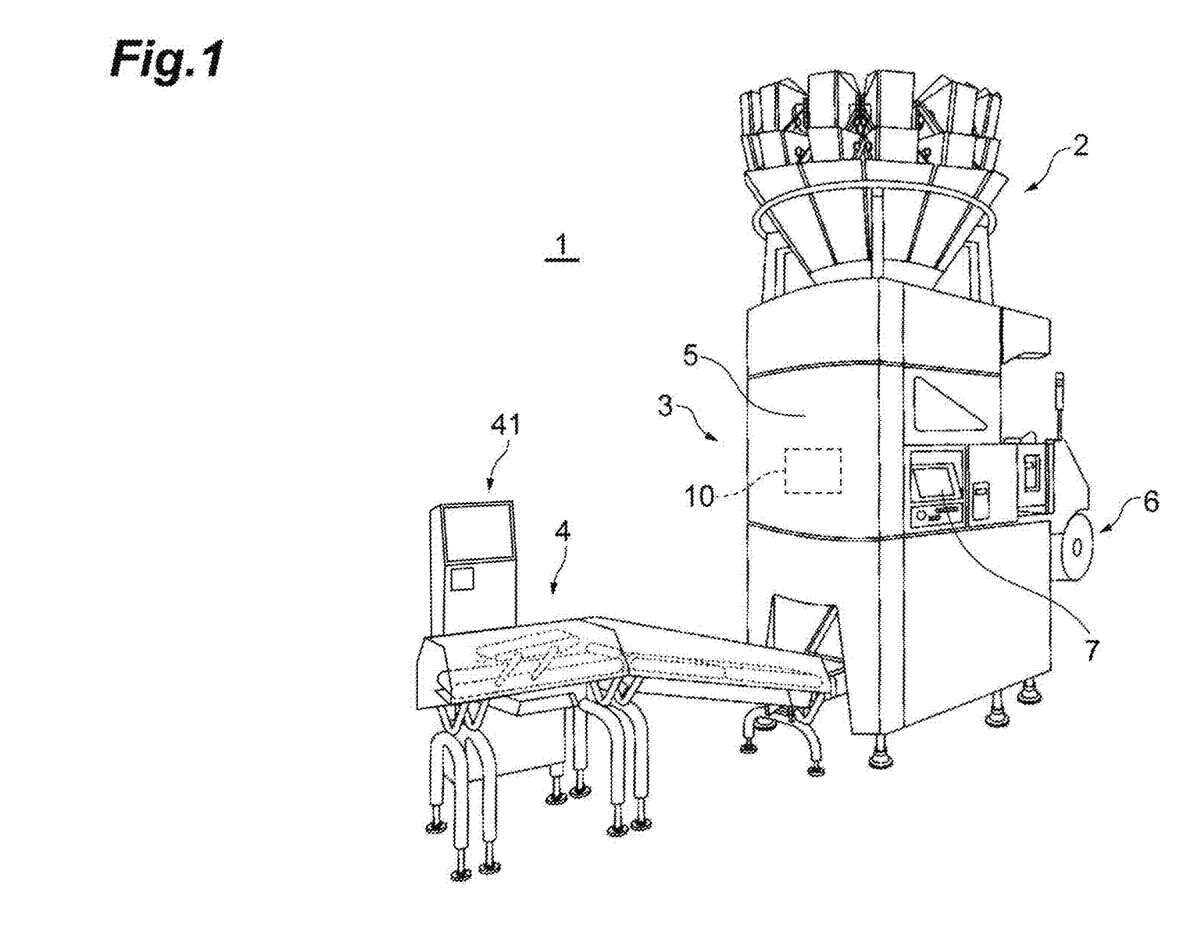
FIG. 1 is a perspective view illustrating a form-fill-seal system according to an embodiment.

A form-fill-seal system 1 illustrated in FIG. 1 is, for example, a system for measuring a predetermined amount of a packing object such as food and packing the predetermined amount of the packing object.

The form-fill-seal system 1 includes a combination weighing machine 2, a form-fill-seal machine 3, and a seal checker (a thickness information acquisition unit) 4.

The combination weighing machine 2 performs combination weighing by weighing a packing object input from the outside using a plurality of weighing hoppers and combining the weight values measured by the respective weighing hoppers to a predetermined total weight. The combination weighing machine 2 supplies the predetermined amount of the packing object weighed by combination weighing to the form-fill-seal machine 3. As the combination weighing machine 2, various devices can be used while the type, the specification, and the like are not particularly limited.

The form-fill-seal machine 3 is a device for filling the packing object supplied from the combination weighing machine 2 into a bag. The form-fill-seal machine 3 is disposed below the combination weighing machine 2. The form-fill-seal machine 3 fills and seals the packing object which falls after being discharged from the combination weighing machine 2 with a film so as to form a bag. The form-fill-seal machine 3 conveys the formed bag to the seal checker 4.

The seal checker 4 checks a sealing condition of the bag by sandwiching the bag conveyed from the form-fill-seal machine 3 from above and below with a predetermined pressure. The seal checker 4 detects a thickness of the bag in a sandwiched state and acquires thickness information of the bag. The seal checker 4 is disposed at the rear stage of the form-fill-seal machine 3. The seal checker 4 includes a monitor 41 which displays thickness information or the like. The seal checker 4 transmits the thickness information to the form-fill-seal machine 3. Good-quality bags that have passed through the seal checker 4 are packed in a cardboard box or the like by a box packing unit.

The thickness information is information obtained at the rear stage of the form-fill-seal machine 3 and is information on the thickness of the bag. The thickness information includes, for example, at least a number, a thickness detection value, and a thickness determination result (see FIG. 6). The thickness determination result is, for example, any one of "Good", "Flat", "Thin", and "Leak". "Good" is a determination result when the thickness state of the bag is appropriate and is a result when the thickness detection value is in an appropriate range. "Flat" is a determination result when the thickness state of the bag is thin and is a result when the thickness detection value is in a range thinner than the appropriate range. "Thin" is a determination result when the thickness state of the bag is thick and is a determination result when the thickness detection value is in a ranger thicker than the appropriate range. "Leak" is a determination result when the bag sealed state is poor and is a determination result when the thickness detection value is in a range thinner than a range involving with Flat.

Additionally, the thickness information is not particularly limited and may be various kinds of information as long as the information relates to the thickness of the bag.

Next, the form-fill-seal machine 3 will be described in detail.

In the following description, the front (front side) is the front (front side) of the form-fill-seal machine 3. The rear (rear side) is the rear (rear side) of the form-fill-seal machine 3. The up to down direction corresponds to the vertical direction. The right and left direction corresponds to the horizontal direction orthogonal to the front to rear direction and the up to down direction.

The form-fill-seal machine 3 includes a form-fill-seal unit 5, a film supply unit 6, a liquid-crystal display 7, and a control unit 10. The form-fill-seal unit 5 fills the packing object into the bag and seals the bag in accordance with a timing in which the packing object is supplied from the combination weighing machine 2. The film supply unit 6 is provided adjacent to the form-fill-seal unit 5. The film supply unit 6 supplies a packing film formed into a bag to the form-fill-seal unit 5. In the film supply unit 6, a film roll on which a film is wound is set. The film is fed from the film roll to the film supply unit 6.

The liquid-crystal display 7 is a touch panel type display. The liquid-crystal display 7 functions as an input device which receives a setting for the form-fill-seal machine 3. The liquid-crystal display 7 functions as an output device which displays information on the form-fill-seal machine 3. The control unit 10 is provided in a main body of the form-fill-seal machine 3. The control unit 10 is a computer including a CPU, a ROM, a RAM, and the like. The control unit 10 controls various kinds of operation of the form-fill-seal machine 3. The control unit 10 displays various kinds of information on the liquid-crystal display 7. A detailed process performed by the control unit 10 will be described below.

Figure 2:
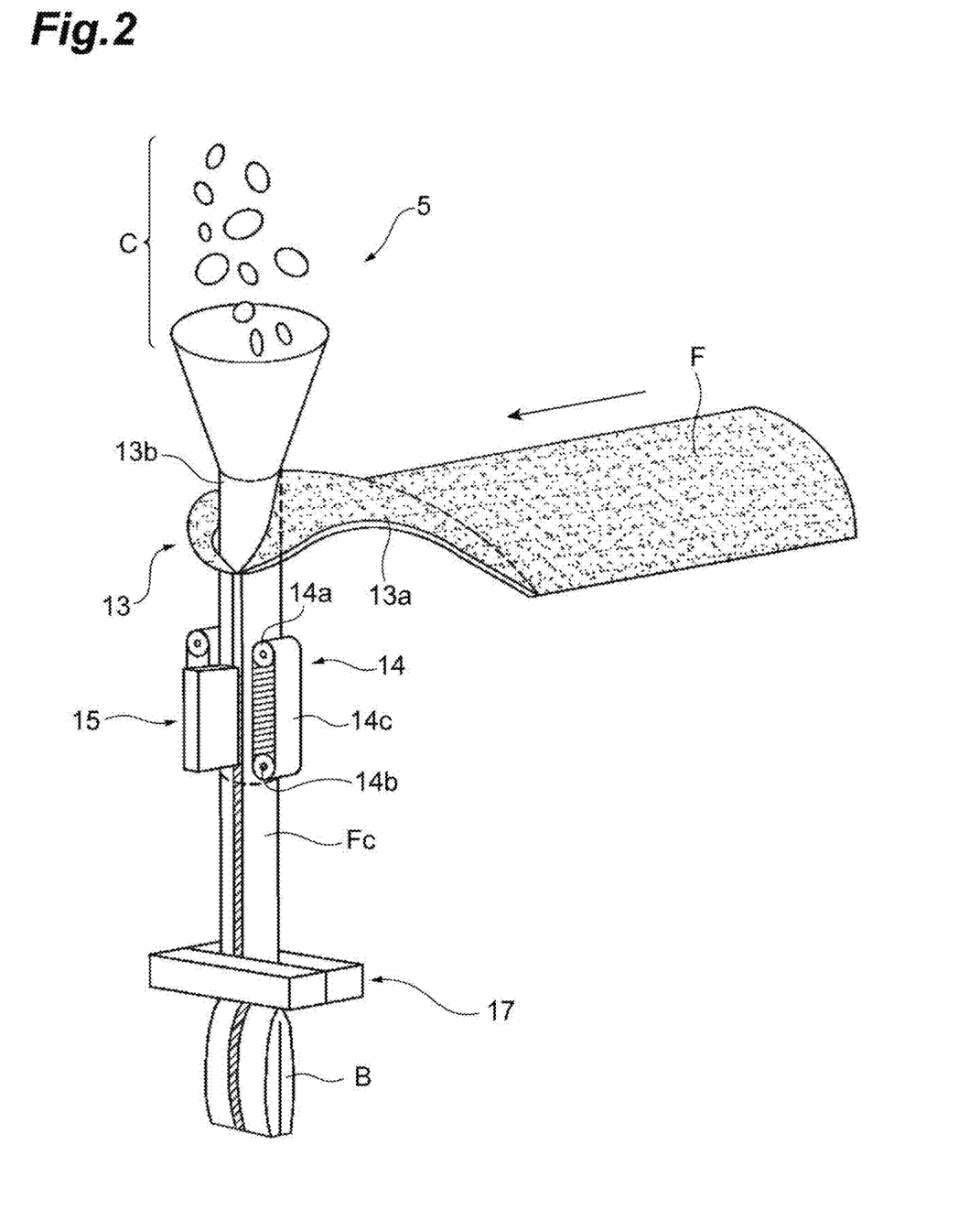
FIG. 2 is a perspective view illustrating a schematic configuration of a form-fill-seal unit.

FIG. 2 is a perspective view illustrating a schematic configuration of the form-fill-seal unit 5. As illustrated in FIG. 2, the form-fill-seal unit 5 includes a forming mechanism 13, a pull-down belt mechanism 14, a vertical sealing mechanism 15, and a horizontal sealing mechanism 17.

The forming mechanism 13 forms a sheet-like film F supplied from the film supply unit 6 into a cylindrical shape. The pull-down belt mechanism 14 conveys the film F formed in a cylindrical shape downward. The vertical sealing mechanism 15 seals an overlapping portion at both ends of the cylindrical film F in the vertical direction parallel to the conveyance direction so as to form a tubular film Fc. The horizontal sealing mechanism 17 seals the tubular film Fc in the horizontal direction orthogonal to the conveyance direction so as to form a bag B of which upper and lower ends are horizontally sealed. The film F and the tubular film Fc constitute a wrapping material.

The forming mechanism 13 includes a tube 13*a* and a former 13*b*. The tube 13*a* is a cylindrical member of which upper and lower ends open. A packing object C supplied from the combination weighing machine 2 is input to the opening of the upper end of the tube 13*a*. The former 13*b* is disposed so as to surround the tube 13*a*. The film F fed from the film roll of the film supply unit 6 is wound on the tube 13*a* into a tubular shape when passing through a gap between the tube 13*a* and the former 13*b*.

The pull-down belt mechanism 14 conveys the film F wound on the tube 13*a* downward while adsorbing the film. The pull-down belt mechanism 14 includes a drive roller 14*a*, a driven roller 14*b*, and a pair of belts 14*c*. The pair of belts 14*c* is disposed on both right and left sides of the tube 13*a* so that the tube 13*a* is sandwiched therebetween.

The pair of belts 14*c* is a mechanism which adsorbs the film F formed in a tubular shape. The pull-down belt mechanism 14 conveys the film F having a tubular shape downward by rotationally driving the pair of belts 14*c* using the drive roller 14*a* and the driven roller 14*b*.

The vertical sealing mechanism 15 seals the film F having a tubular shape in the vertical direction (the up to down direction in FIG. 2). The vertical sealing mechanism 15 moves in the front to rear direction so as to move closer to the tube 13*a* or move away from the tube 13*a* by a drive mechanism (not illustrated). The vertical sealing mechanism 15 heats the overlapping portion of the film F while pressing the overlapping portion against the tube 13*a* with a constant pressure and seals the overlapping portion of the film F in the vertical direction so as to form the tubular film Fc.

Figure 3A:
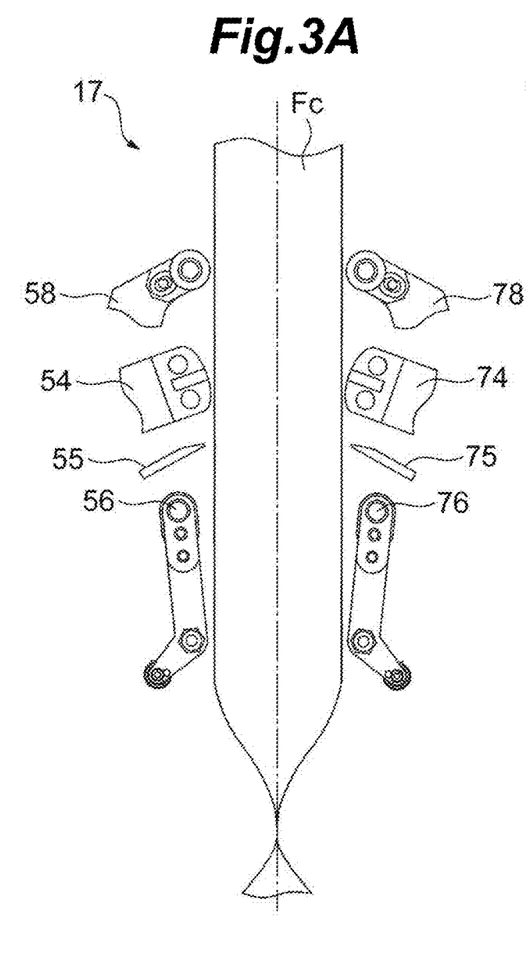
FIG. 3A is a schematic diagram for describing an operation example of a horizontal sealing mechanism.
Figure 3B:
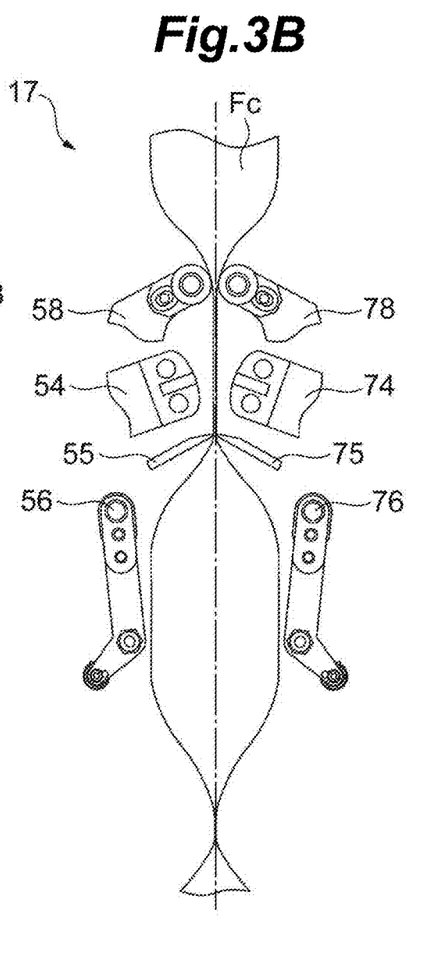
FIG. 3B is a schematic diagram illustrating a continuation of FIG. 3A.
Figure 3C:
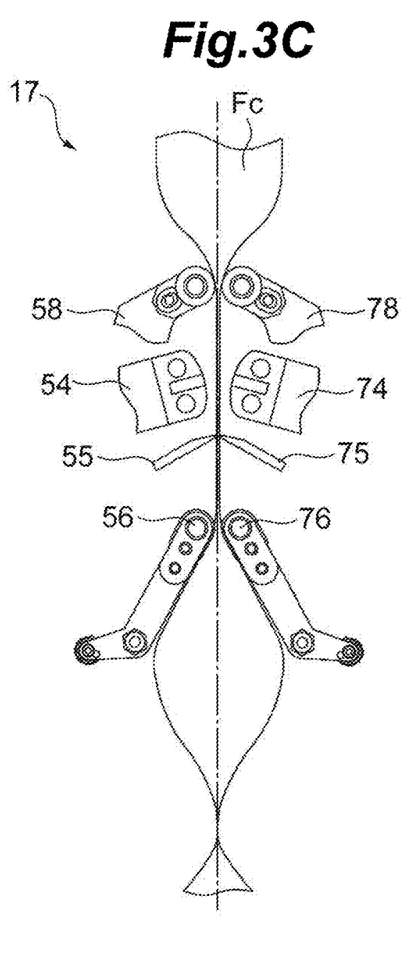
FIG. 3C is a schematic diagram illustrating a continuation of FIG. 3B.
Figure 4A:
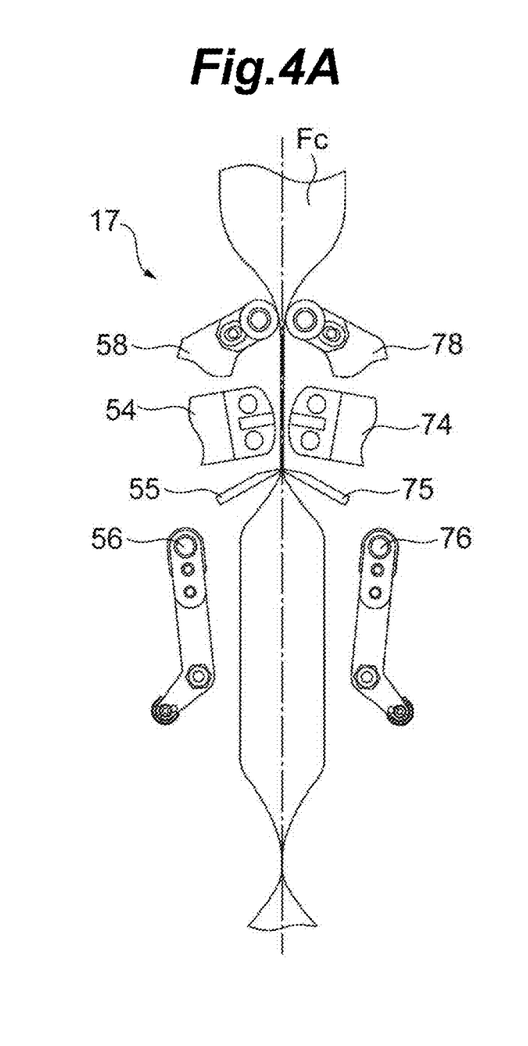
FIG. 4A is a schematic diagram illustrating a continuation of FIG. 3C
Figure 4B:
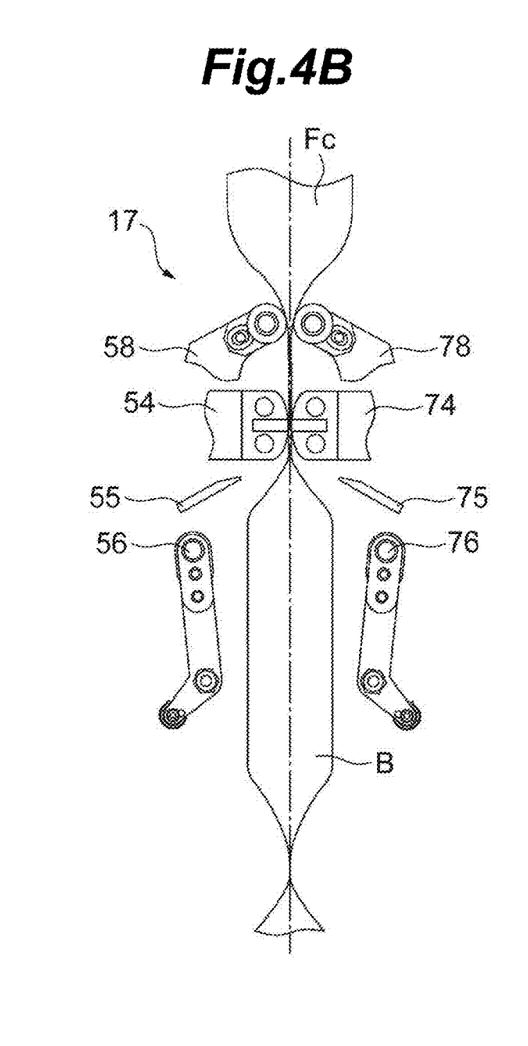
FIG. 4B is a schematic diagram illustrating a continuation of FIG. 4A.

The horizontal sealing mechanism 17 seals the tubular film Fc in the horizontal direction (the right and left direction in FIG. 2). The horizontal sealing mechanism 17 is disposed below the forming mechanism 13, the pull-down belt mechanism 14, and the vertical sealing mechanism 15. As illustrated in FIGS. 2 to 4, the horizontal sealing mechanism 17 includes at least a pair of seal jaws 54 and 74, a pair of ironing members 55 and 75, a pair of gas release members 56 and 76, and a pair of crumb rollers 58 and 78.

The seal jaws 54 and 74 contact each other when sealing the tubular film Fc in the horizontal direction. The seal jaws 54 and 74 include a heater (not illustrated) provided therein. The tubular film Fc sandwiched between the seal jaws 54 and 74 is thermally sealed by the heater. The ironing members 55 and 75 are plates which are made of an elastic material. The ironing members 55 and 75 forcibly drop the packing object C inside the tubular film Fc downward by squeezing the tubular film Fc downward so as to prevent the seal jaws 54 and 74 from biting foreign matter such as the packing object C.

The gas release members 56 and 76 constitute a thickness adjustment unit 9 (see FIG. 5) which adjusts the thickness of the bag. The gas release members 56 and 76 move closer to each other so as to hit the tubular film Fc immediately before the seal jaws 54 and 74 horizontally seals the tubular film Fc. Accordingly, air inside the tubular film Fc is extruded and discharged upward so as to adjust the thickness of the tubular film Fc. Immediately before the seal jaws 54 and 74 horizontally seals the tubular film Fc, the crumb rollers 58 and 78 hit the tubular film Fc earlier than the seal jaws 54 and 74 and sandwiches the tubular film Fc with a slight gap therebetween. The packing object C supplied from the combination weighing machine 2 is input into the tubular film Fc above the portion sandwiched between the crumb rollers 58 and 78.

Next, an operation example of the horizontal sealing mechanism 17 of the form-fill-seal machine 3 will be described. In the state illustrated in FIG. 3A, the pair of crumb rollers 58 and 78 is separated from each other, the pair of ironing members 55 and 75 is separated from each other, the pair of seal jaws 54 and 74 is separated from each other, and the pair of gas release members 56 and 76 is separated from each other. From this state, as illustrated in FIG. 3B, the crumb rollers 58 and 78 move closer to each other and the packing object C weighed by the combination weighing machine 2 is supplied from above. The ironing members 55 and 75 move closer to each other and start to stroke the tubular film Fc downward.

Subsequently, as illustrated in FIG. 3C, the gas release members 56 and 76 move closer to each other so as to hit the tubular film Fc so that the tubular film Fc is sandwiched by the gas release members 56 and 76. Accordingly, air inside the tubular film Fc is extruded and discharged upward by the pair of gas release members 56 and 76 so that the thickness of the tubular film Fc is adjusted. Then, as illustrated in FIG. 4A, the gas release members 56 and 76 move away from each other so that the tubular film Fc is not sandwiched by the gas release members 56 and 76.

Subsequently, as illustrated in FIG. 4B, the ironing members 55 and 75 move away from each other so that the ironing of the tubular film Fc ends. At the same time, the seal jaws 54 and 74 move closer to each other so as to hit the tubular film Fc and the tubular film Fc is sandwiched by the seal jaws 54 and 74. A predetermined heat is applied to the tubular film Fc by the heaters of the seal jaws 54 and 74 so that the tubular film Fc is horizontally sealed. Accordingly, the bag B having a space where the packing object C exists below the portion horizontally sealed by the seal jaws 54 and 74 is formed while being connected to the subsequent tubular film Fc. Then, the horizontally sealed portion of the tubular film Fc is cut in the horizontal direction and the bag B is cut and separated from the subsequent tubular film Fc.

Next, a main part of the form-fill-seal system 1 will be described.

Figure 5:
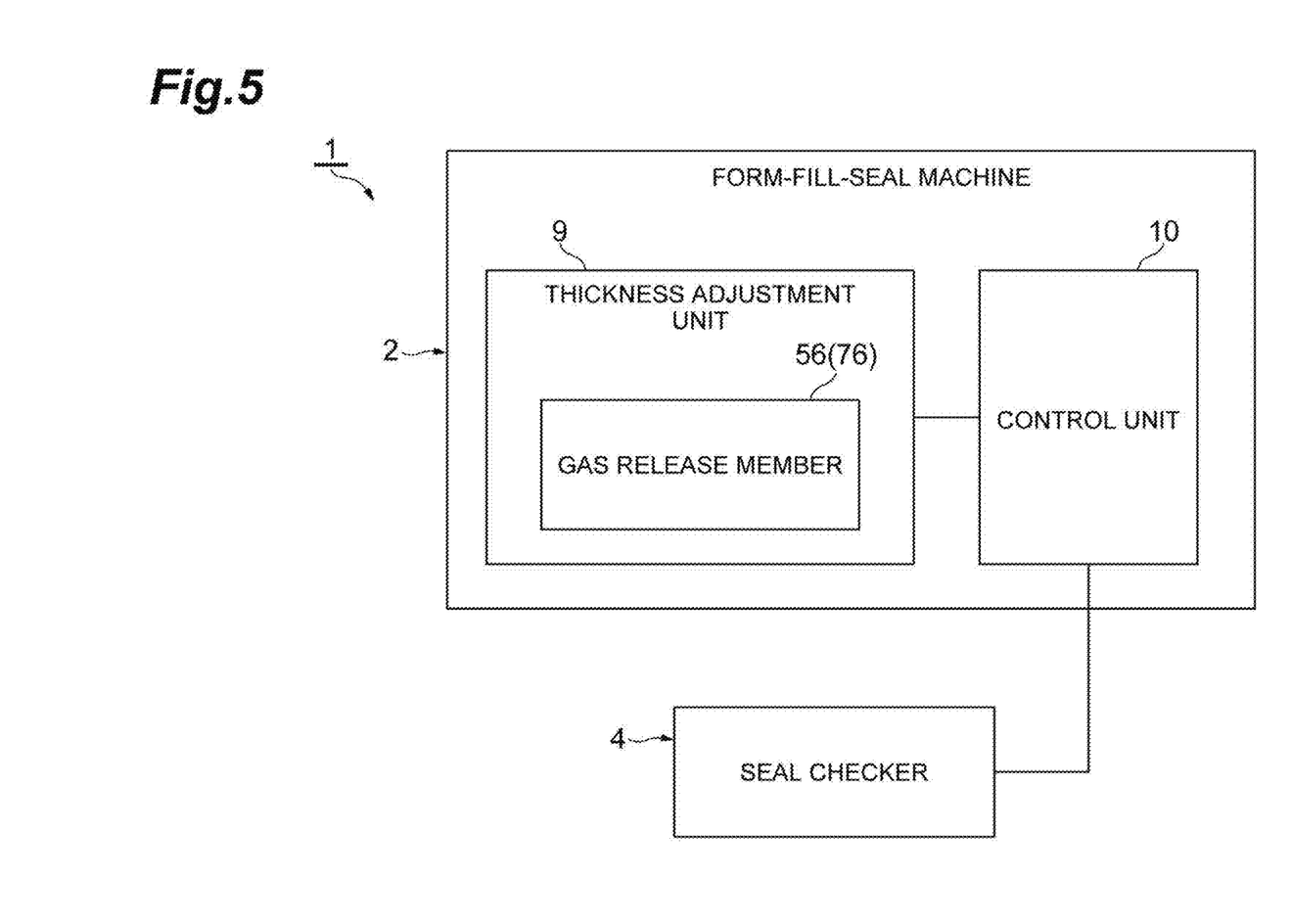
FIG. 5 is a block diagram illustrating a main part of the form-fill-seal system.

FIG. 5 is a block diagram illustrating a main part of the form-fill-seal system 1. As illustrated in FIG. 5, the form-fill-seal machine 3 includes the gas release members 56 and 76 as the thickness adjustment unit 9 which adjusts the thickness of the bag B to be formed. The seal checker 4 constitutes a thickness information acquisition unit which acquires the thickness information of the bag B formed by the form-fill-seal machine 3. The seal checker 4 transmits the thickness information to the control unit 10 whenever acquiring the thickness information of one bag B.

The control unit 10 controls the thickness of the bag B to be formed by controlling the operation of the thickness adjustment unit 9. Specifically, when the control unit 10 controls the time that the pair of gas release members 56 and 76 sandwiches the tubular film Fc before the horizontal sealing, the amount of the gas discharged from the inside of the tubular film Fc is adjusted to increase or decrease the thickness of bag B after the bag is formed. When the control unit 10 increases the sandwiching time, the amount of the gas discharged from the inside of the tubular film Fc is increased to decrease (thin) the thickness of the bag B after the bag is formed. Meanwhile, when the control unit 10 decreases the sandwiching time, the amount of the gas discharged from the inside of the tubular film Fc is decreased to increase (thicken) the thickness of the bag B after the bag is formed.

The control unit 10 receives and acquires the thickness information from the seal checker 4. The control unit 10 controls the operation of the thickness adjustment unit 9 on the basis of the result obtained by performing the statistical processing on the acquired thickness information so that the thickness of the bag B formed by the form-fill-seal machine 3 becomes uniform in an appropriate range. Statistical processing is processing for extracting probable information included in data having noise, variation, and error. Statistical processing is processing for objectively grasping the attributes (characteristics) of data. Statistical processing is processing based on probability theory. Hereinafter, the processing of the control unit 10 will be described in detail.

The control unit 10 determines whether the thickness state of a predetermined number or more of bags in the bag group is abnormal from the thickness information of the bag group (a group of bags) including a plurality of bags B. The control unit 10 controls the operation of the thickness adjustment unit 9 in response to the determination result.

Figure 6:
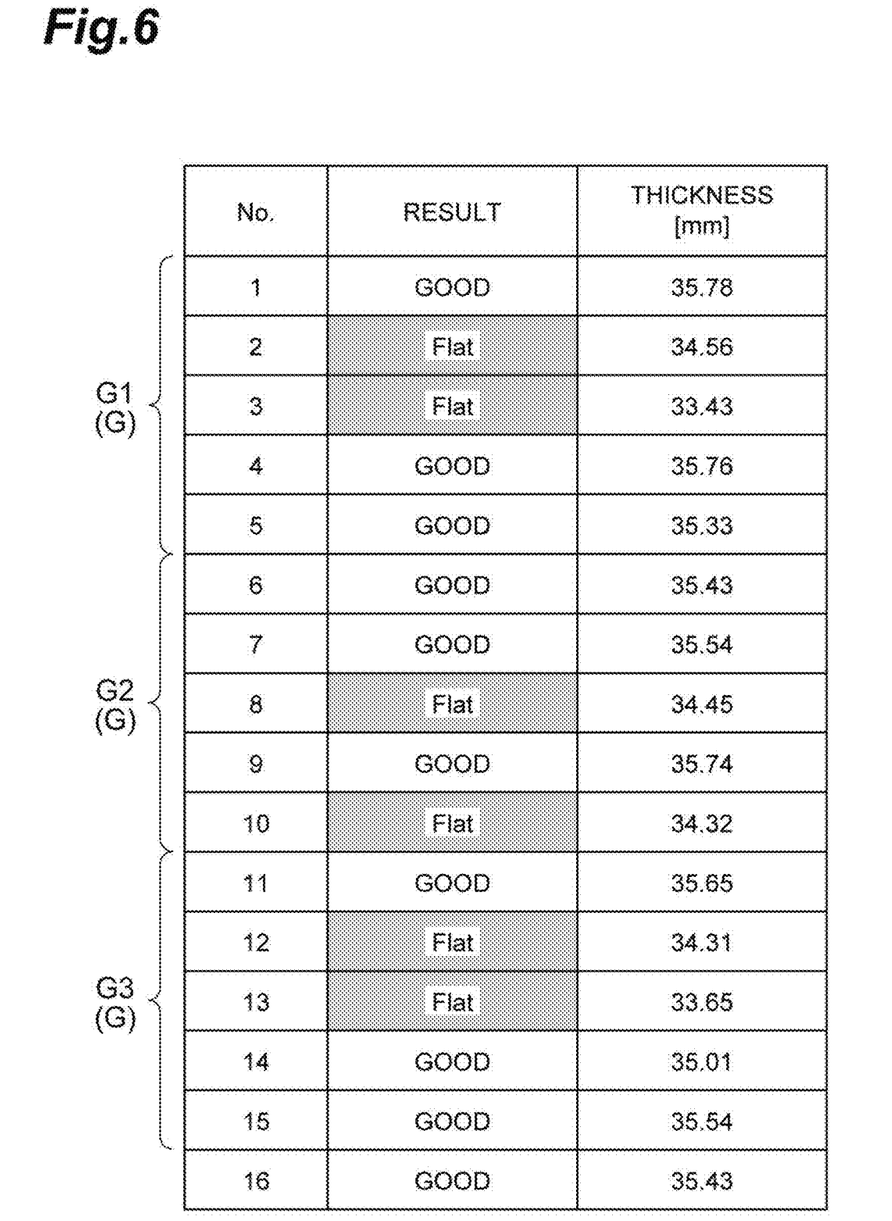
FIG. 6 is a diagram illustrating an example of thickness information acquired by a seal checker.

Specifically, the control unit 10 defines a bag group G for each of a certain number of (five in the example of the drawing) bags B in the order in which the bags are formed by the form-fill-seal machine 3 as illustrated in FIG. 6. The control unit 10 determines whether the thickness state of the predetermined number or more of bags B in the bag group G is "Flat". When it is determined that the thickness state of the predetermined number or more of bags B is "Flat", the control unit 10 controls the operation of the thickness adjustment unit 9 so that the thickness of the bag B increases (here, the thickness of the bag B increases by a small amount).

The predetermined number is an integer equal to or larger than 1 and equal to or smaller than the number of bags (a certain number) that defines the bag group G For example, the predetermined number is two. The small amount is an amount which is sufficiently small with respect to the thickness of the entire bag B. The small amount is, for example, 2 mm. The certain number, the predetermined number, and the small amount can be set in advance in response to, for example, the input from the liquid-crystal display 7. The certain number, the predetermined number, and the small amount may be fixed values or variable values.

For example, in the example illustrated in the drawings, the control unit 10 sequentially receives the thickness information of the bags B of No. 1 to No. 5 from the seal checker 4 and defines a bag group G1 by these bags B. The control unit 10 determines that the thickness state of the predetermined number or more of bags B in the bag group G1 is "Flat" and decreases the sandwiching time of the gas release members 56 and 76 so that the thickness of the bag B increases by a small amount. Further, the control unit 10 sequentially receives the thickness information of the bags B of No. 6 to No. 10 from the seal checker 4 and defines a bag group G2 by these bags B. The control unit 10 determines that the thickness state of the predetermined number or more of bags B in the bag group G2 is "Flat" and decreases the sandwiching time of the gas release members 56 and 76 by a small amount so that the thickness of the bag B increases by a small amount.

Furthermore, the control unit 10 sequentially receives the thickness information of the bags B of No. 11 to No. 15 from the seal checker 4 and defines a bag group G3 by these bags B. The control unit 10 determines that the thickness state of the predetermined number or more of bags B in the bag group G3 is "Flat" and decreases the sandwiching time of the gas release members 56 and 76 by a small amount so that the thickness of the bag B increases by a small amount.

Figure 7A:
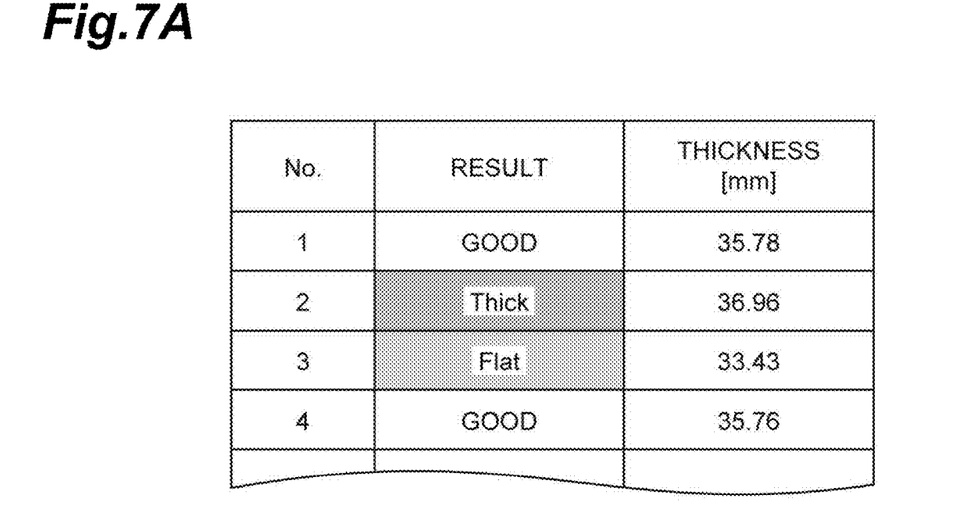
FIG. 7A is a diagram illustrating another example of thickness information acquired by the seal checker and FIG. 7B is a diagram illustrating still another example of thickness information acquired by the seal checker.

Further, the control unit 10 determines whether the thickness state of the bag B is "Thick" on the basis of the thickness information. When it is determined that the thickness state of the bag B is "Thick", the control unit 10 controls the operation of the thickness adjustment unit 9 so that the thickness of the bag B decreases (here, the thickness of the bag B decreases by a small amount). For example, in the example illustrated in FIG. 7A, when the control unit 10 receives the thickness information of the bag B of No. 2 from the seal checker 4 and determines that the thickness state of the bag B is "Thick", the sandwiching time of the gas release members 56 and 76 is increased by a small amount so that the thickness of the bag B decreases by a small amount.

Figure 7B:
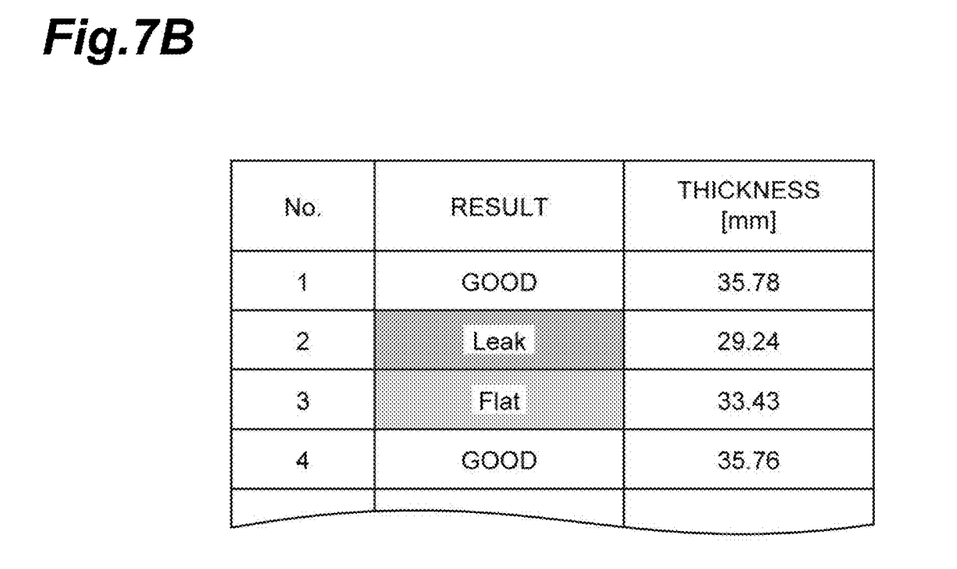

Further, the control unit 10 determines whether the bag B is "Leak" on the basis of the thickness information. The control unit 10 ignores the thickness information of the bag B when it is determined that the bag B is "Leak". For example, in the example illustrated in FIG. 7B, the control unit 10 receives the thickness information of the bag B of No. 2 from the seal checker 4 and determines that the thickness state of the bag B is "Leak". In this case, the control unit 10 ignores the thickness information of the bag B of No. 2. Additionally, when the thickness information of the bag B is ignored, the thickness information is not used as data for controlling the operation of the thickness adjustment unit 9.

As described above, in the form-fill-seal machine 3 and the form-fill-seal system 1, the thickness of the bag B is adjusted on the basis of the result obtained by performing statistical processing on the thickness information. Thus, it is possible to make the thickness of the formed bag B uniform by effectively controlling the thickness of the formed bag B.

In the form-fill-seal machine 3 and the form-fill-seal system 1, when it is determined that the thickness state of the predetermined number or more of bags B in the bag group G is abnormal from the thickness information of the bag group G, the control unit 10 controls the operation of the thickness adjustment unit 9 in response to the determination result. According to this configuration, the thickness of the bag B can be adjusted by the thickness adjustment unit 9 (hereinafter, also simply referred to as "thickness adjustment") in consideration of noise, variation, or the like included in the thickness information.

In the form-fill-seal machine 3 and the form-fill-seal system 1, the control unit 10 controls the operation of the thickness adjustment unit 9 so that the thickness of the bag B increases when it is determined that the thickness state of the predetermined number or more of bags in the bag group G is "Flat". When it is determined that the thickness state of the predetermined number or more of bags B in the plurality of bags B is "Flat", it is found that there is a high possibility of requiring the thickness adjustment for increasing the thickness of the bag B. Thus, according to this configuration, it is possible to effectively perform the thickness adjustment for increasing the thickness of the bag B.

In the form-fill-seal machine 3 and the form-fill-seal system 1, the control unit 10 controls the operation of the thickness adjustment unit 9 so that the thickness of the bag B decreases when it is determined that the thickness state of the bag B is "Thick" from the thickness information of the bag B. When it is determined that the thickness state of any one of the bags B is "Thick", it is found that there is a high possibility of requiring the thickness adjustment for decreasing the thickness of the bag B. That is, in the determination result of "Thick", it is found that there is a high possibility of requiring the prompt thickness adjustment when any one of them is thick differently from the determination result of "Flat". Thus, according to this configuration, it is possible to effectively perform the thickness adjustment for increasing the thickness of the bag B.

Since the thickness information can be obtained by the seal checker 4 at the rear stage of the form-fill-seal machine 3, there is a delay before the result obtained by adjusting the thickness of the bag B by the thickness adjustment unit 9 is reflected on the thickness information. In this regard, in the form-fill-seal machine 3 and the form-fill-seal system 1, the control unit 10 controls the operation of the thickness adjustment unit 9 so that the thickness of the bag B increases by a small amount and decreases by a small amount. Accordingly, it is possible to suppress an adverse effect caused by the delay from influencing the thickness adjustment as compared with a case in which the thickness of the bag B is greatly increased or decreased by a certain amount at one time. In consideration of the delay (assuming that there is a delay), the thickness of the bag B can be gradually increased or decreased. It is possible to suppress that the thickness of the bag B does not converge to the thickness of "Good" and moves (varies) between the thickness of "Flat" and the thickness of "Thick".

In the form-fill-seal machine 3 and the form-fill-seal system 1, the control unit 10 ignores the thickness information when it is determined that the bag B is "Leak" from the thickness information. It is found that the poor sealed state of the bag B often occurs due to an abnormality in a portion other than the thickness adjustment unit 9 and occurs regardless of the presence or absence of the thickness adjustment. Thus, it is possible to exclude unnecessary information for adjusting the thickness of the bag B by ignoring the thickness information when it is determined that the sealed state of the bag B is poor (that is, "Leak").

An embodiment of the present disclosure has been described, but one embodiment and another embodiment of the present disclosure are not limited to the above-described embodiment.

In the above-described embodiment, the control unit 10 controls the operation of the thickness adjustment unit 9 so that the thickness of the bag B increases by a small amount or decreases by a small amount, but may control the operation of the thickness adjustment unit 9 so that the thickness of the bag B becomes the target thickness. The target thickness can be set in advance in response to, for example, the input from the liquid-crystal display 7. The target thickness may be a fixed value or a variable value. According to this configuration, it is possible to promptly make the thickness of the formed bag B uniform.

In the above-described embodiment, the control unit 10 may correct the control amount of the thickness adjustment unit 9 (for example, the time that the pair of gas release members 56 and 76 sandwiches the tubular film Fc before the horizontal sealing) in response to the correction value. The correction value may be a preset value or a learning value obtained by machine learning based on a past control history of the control unit 10. For machine learning, various known machine learnings can be adopted. According to this configuration, it is possible to promptly make the thickness of the bag B uniform with high accuracy.

In the above-described embodiment, the control unit 10 may perform an interval control of ignoring the thickness information of a certain number of bags B created after controlling the operation of the thickness adjustment unit 9. The certain number in the interval control may be the same as the number of bags defining the bag group G (five in FIG. 6) or may be another number. The certain number is not particularly limited and may the number in consideration of the above-described delay. The certain number may be equal to or larger than the number of bags existing between the bag B immediately after the bag is formed by the form-fill-seal machine 3 and the bag B when the thickness information is acquired by the seal checker 4. The certain number can be set in advance in response to, for example, the input from the liquid-crystal display 7.

According to this configuration, it is possible to control the operation of the thickness adjustment unit 9 on the basis of the thickness information in consideration of the above-described delay (the thickness information which excludes the one not reflecting the precedent thickness adjustment result). As a result, since the thickness having been already adjusted to an appropriate thickness is not reflected on the thickness information due to the influence of the above-described delay, it is possible to suppress an increase and decrease in the thickness of the bag B (unnecessary thickness adjustment).

In the above-described embodiment, the control unit 10 may calculate the moving average of the thickness of the bag B from the thickness information and control the operation of the thickness adjustment unit on the basis of the calculated moving average. According to this configuration, the thickness can be adjusted in consideration of the variation included in the thickness information.

In the above-described embodiment, the seal checker 4 is provided as the thickness information acquisition unit, but the thickness information acquisition unit is not limited to the seal checker 4. If the thickness information of the bag B can be acquired at the rear stage of the form-fill-seal machine 3, various devices or instruments can be used as the thickness information acquisition unit.

REFERENCE SIGNS LIST

1: form-fill-seal system, 3: form-fill-seal machine, 4: seal checker (thickness information acquisition unit), 9: thickness adjustment unit, 10: control unit, B: bag, C: packing object, F: film (wrapping material), Fc: tubular film (wrapping material), G, G1 to G3: bag group (group of bags).

The invention claimed is:

1. A form-fill-seal machine for forming a bag by filling and sealing a packing object in a wrapping material, comprising:
   a thickness adjustment unit which adjusts a thickness of the bag; and
   a control unit which controls an operation of the thickness adjustment unit,
   wherein the control unit acquires thickness information obtained in a rear stage of the form-fill-seal machine and relating to a thickness of the bag, determines whether there is a predetermined number or more of the bags having a thickness state that is abnormal in a plurality of groups of the bags based on the thickness information acquired, and controls the operation of the thickness adjustment unit based on a result of the determination.

2. The form-fill-seal machine according to claim 1,
   wherein when it is determined that a thickness state of a predetermined number or more of the bags in a group of the bags is abnormal from the thickness information of the group of bags including a plurality of the bags, the control unit controls the operation of the thickness adjustment unit in response to the determination result.

3. The form-fill-seal machine according to claim 2,
   wherein when it is determined that the thickness state of the predetermined number or more of bags in the group of bags is thin, the control unit controls the operation of the thickness adjustment unit so that the thickness of the bag increases.

4. The form-fill-seal machine according to claim 1,
   wherein when it is determined that the thickness state of the bag is thick from the thickness information of the bag, the control unit controls the operation of the thickness adjustment unit so that the thickness of the bag decreases.

5. The form-fill-seal machine according to claim 1,
   wherein the control unit calculates a moving average of the thickness of the bag from the thickness information and controls the operation of the thickness adjustment unit based on the calculated moving average.

6. The form-fill-seal machine according to claim 1,
   wherein the control unit controls the operation of the thickness adjustment unit so that the thickness of the bag becomes a target thickness.

7. The form-fill-seal machine according to claim 6,
   wherein the control unit corrects a control amount of the thickness adjustment unit in response to a correction value, and
   wherein the correction value is a preset value or a learning value obtained by machine learning based on a past control history of the control unit.

8. The form-fill-seal machine according to claim 1,
   wherein when it is determined that the bag sealed state is poor from the thickness information, the control unit ignores the thickness information.

9. The form-fill-seal machine according to claim 1,
   wherein the control unit performs an interval control that ignores the thickness information of a certain number of the bags created immediately after controlling the operation of the thickness adjustment unit.

10. A form-fill-seal system comprising:
    the form-fill-seal machine according to claim 1; and
    a thickness information acquisition unit which is disposed in a rear stage of the form-fill-seal machine and acquires thickness information.

* * * * *